(12) United States Patent
Kawagishi

(10) Patent No.: US 6,409,080 B2
(45) Date of Patent: Jun. 25, 2002

(54) PORTABLE ELECTRONIC DEVICE AND LOYALTY POINT SYSTEM

(75) Inventor: Toshiyuki Kawagishi, Tokyo (JP)

(73) Assignee: Kabushiki Kaisha Toshiba, Kanagawa-Ken (JP)

( * ) Notice: Subject to any disclaimer, the term of this patent is extended or adjusted under 35 U.S.C. 154(b) by 0 days.

(21) Appl. No.: 09/788,425

(22) Filed: Feb. 21, 2001

(30) Foreign Application Priority Data

Mar. 27, 2000 (JP) ........................................ 2000-085994

(51) Int. Cl.[7] .............................. G06F 17/00; G06K 5/00
(52) U.S. Cl. ........................................ 235/375; 235/380
(58) Field of Search ................................ 235/375, 379, 235/380; 705/14

(56) References Cited

U.S. PATENT DOCUMENTS

| | | | | |
|---|---|---|---|---|
| 5,806,045 A | * | 9/1998 | Biorge et al. | 705/14 |
| 5,901,303 A | * | 5/1999 | Chew | 395/400 |
| 6,112,987 A | * | 9/2000 | Lambert et al. | 235/380 |
| 6,222,914 B1 | * | 4/2001 | McMullin | 379/144 |

FOREIGN PATENT DOCUMENTS

| | | | |
|---|---|---|---|
| EP | 0775990 A2 | * | 5/1997 |
| EP | 09333717 A2 | * | 8/1999 |

* cited by examiner

*Primary Examiner*—Karl D. Frech
*Assistant Examiner*—April A. Nowlin
(74) *Attorney, Agent, or Firm*—Pillsbury Winthrop LLP

(57) ABSTRACT

A portable electronic device, which executes a prescribed process based on a selling amount of money that is input from a terminal device, has a memory for storing information concerned with a loyalty point calculation process corresponding to a selling amount of money, calculates a loyalty point using information stored in the memory based on a selling amount of money which is input from the terminal device and updates a loyalty point stored in the memory to a calculated loyalty point.

14 Claims, 7 Drawing Sheets

| | | |
|---|---|---|
| 22a | NAME | HANAKO TOSHIBA |
| 22b | DATE OF BIRTH | 1970-3-3 |
| 22c | MANAGEMENT NUMBER | 98765 |
| 22d | PHONE NUMBER | 03-1234-5678 |
| 22e | NUMBER OF TIMES OF COMING TO STORE | 3 |
| 22f | PURCHASE AMOUNT OF MONEY | 12345 |
| 22g | NUMBERS OF LOYALTY POINTS | 500 |
| 22h | ADDING DATE OF LOYALTY POINTS | 2000-1-1 |
| 22i | TERM OF VALIDITY | 2000-3-31 |

| ITEM | | QUALIFICATION | RATIO OF SERVICE |
|---|---|---|---|
| NUMBERS OF BASIC LOYALTY POINT | | EVERY 100 YEN | 5 LOYALTY POINT |
| NUMBER OF VISITING STORE | | ABOVE 5 | 2 MULTIPLE |
| | | ABOVE 10 | 3 MULTIPLE |
| | | ABOVE 20 | 5 MULTIPLE |
| DATE OF BIRTH | | AGREED WITH DATE | 3 MULTIPLE |
| PURCHASE AMOUNT OF MONEY | | ABOVE 50,000 YEN | 2 MULTIPLE |
| | | ABOVE 80,000 YEN | 3 MULTIPLE |
| | | ABOVE 100,000 YEN | 5 MULTIPLE |
| PHONE NUMBER | | LOWER 2 DIGITS AGREES WITH 01 | 3 MULTIPLE |
| ... | | ... | ... |

FIG. 5

PORTABLE ELECTRONIC DEVICE AND LOYALTY POINT SYSTEM

BACKGROUND OF THE INVENTION

Field of the Invention

The present invention relates to a portable electronic device that is held by a customer and stores individual information. More particularly the present invention relates to a portable electronic device that is capable of providing a service of adding loyalty points according to a degree of utilization of a store by a customer in a loyalty point system in the retain business.

A special benefit system, called a loyalty point system, has been introduced in recent years into retail stores including supermarkets. This system converts a total amount of money of purchased merchandise into loyalty points each time a customer purchases merchandise. The loyalty points are accumulated. When the accumulated loyalty points reach a prescribed value, a little gift or a coupon is presented for merchandise purchased next time are discounted aiming at the fixation of customers.

This system generally uses card type media including magnetic cards and the like. In other words, a customer who is a member of this system and carrying a membership card issued from a store shows the membership card to a store clerk when purchasing merchandise and pays a price. The shop clerk registers the sales data of the merchandise purchased by that customer it such a merchandise sales data processor as an electronic cash register, a POS terminal, etc. At the same time, the card data of the membership card is read by a card reader/writer provided to the merchandise sales data processor. An accumulated loyalty point up to the last time is recorded on this membership card.

After reading accumulated loyalty point data of a membership card by the card reader/writer, the merchandise sales data processor obtains the total amount of money for merchandise purchased by a customer by processing the registered merchandise sales data and converts the total amount of money into a loyalty point. Then, the loyalty point calculated this time is added to the accumulated loyalty point data read from the membership card and this added value is written into the membership card as an accumulated loyalty point up to the present time by the card reader/writer. This loyalty point system has been programmed as described above.

In Japanese Laid-Open Patent Publication No. Hei 9-212743 and Japanese Laid-Open Patent Publication No. Hei 6-76124, the application of this system to provide the special service, wherein loyalty points are calculated by changing the point conversion ratio according to the amount of money and by setting the loyalty point conversion at a higher level than the ordinary level, was disclosed.

In the existing system described above, point information is read out of a card that recorded loyalty points and after calculating loyalty point by a card processor that is generally called as a reader/writer, the calculated loyalty point information is recorded on a card. However, there was a possibility of illegally calculating loyalty points by maliciously rewriting a program stored in a card processor by a store clerk. Further, for calculating loyalty points it is necessary to output individual information recorded on a card to an external device (a card processor), there is generated a problem from the viewpoint of security.

SUMMARY OF THE INVENTION

It is an object of the present invention to provide a portable electronic device and a loyalty point system capable of calculating loyalty points corresponding to individual information while keeping the security.

According to the present invention, there is provided a portable electronic device for executing a prescribed process according to information related to the selling amount of money that is input from a terminal device, which comprises: a means to store information on a calculation process of loyalty points corresponding to a selling amount of money and a calculated loyalty point; a means to calculate loyalty points using information stored in the storage means according to information on an amount of money of sales that is input from the terminal device; and a means to update the loyalty point stored in the storage means to a loyalty point calculated by the calculation means.

Further, according to the present invention, there is provided a loyalty point system, which comprises a portable electric device including: a storage means to store a prescribed application program for calculating loyalty points corresponding to an amount of money for sales and loyalty point; a means to calculate loyalty point according to the application program stored in the storage means based on the dealt amount of money that is input from the terminal device; a means to update the loyalty point stored in the storage means to the loyalty point calculated by the calculating means; and an output means to output the loyalty points calculated by the calculating means to the terminal device, and the terminal device including a display means to display the loyalty point that is output from the portable electronic device.

BRIEF DESCRIPTION OF THE DRAWINGS

FIG. 4 is a table showing individual information stored in a data memory of an IC card;

FIG. 5 is a table showing loyalty point service information relative to a loyalty point service application stored in a data memory of an IC card;

DETAILED DESCRIPTION OF THE PREFERRED EMBODIMENTS

Figure 1:
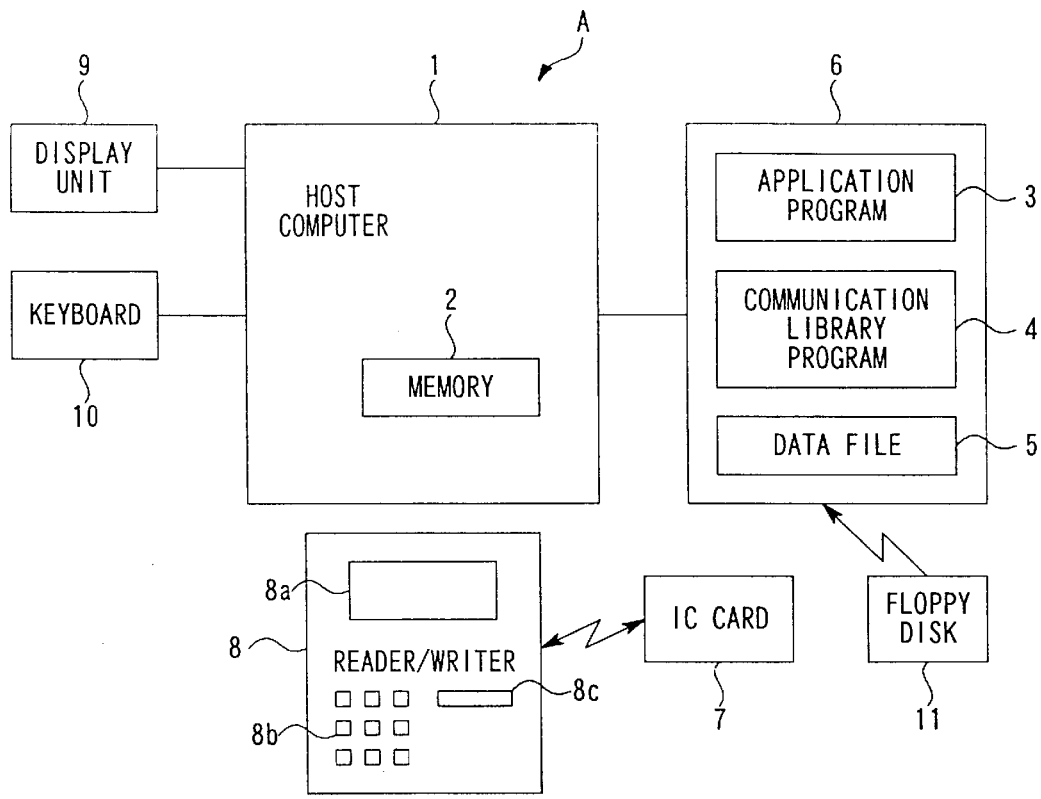
FIG. 1 is a schematic block diagram showing a loyalty point system using an IC card as a portable electronic device of the present invention.

Preferred embodiments of the present invention will be described below referring to the attached drawings. FIG. 1 is a diagram for explaining a loyalty point system A using an IC card as a portable electronic device involved of the present invention. As shown in FIG. 1, the loyalty point system A has a host computer 1 as a higher device having a memory 2, an auxiliary storage 6 connected to this host computer 1, a reader/writer 8 as a terminal unit, a display unit 9 and a keyboard 10.

The auxiliary storage 6 houses an application program 3, a communication library program 4 and a data file 5. It is also possible to install programs, etc. in the auxiliary storage 6 from a storage medium, for example, a floppy disk 11. The reader/writer 8 reads and writes (transmission/reception) a message to the IC CARD 7 in contact or non-contact with it. The display unit 9 is to inform the operating procedures and the operating state. The keyboard 10 is used to input amount of purchase and other data by operator.

The reader/writer 8 as a terminal unit has a display 8a as a display means, a keyboard 8b as an input means, and an IC card slot 8c (as this embodiment is explained using a contact type IC card). The display 8a displays the process contents in the reader/writer 8, information relative to information forwarded from the IC card 7, etc. The keyboard 8b is for inputting various kinds of information and, for example, to select the process contents in the reader/writer 8, input a code and amount of money information.

Figure 2:
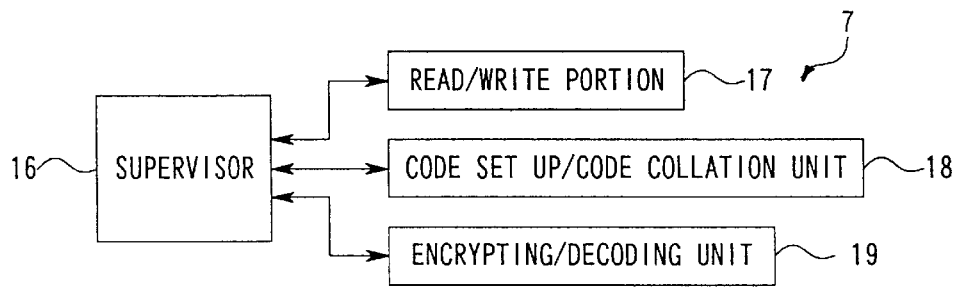
FIG. 2 is a block diagram showing the basic function of the IC card that is used for the loyalty point system.

FIG. 2 is a diagram showing the functional blocks of the IC card 7. As shown in FIG. 2, the IC card 7 is composed of portions for executing fundamental functions such as a read/write portion 17, a code set up/code collation unit 18 and an encrypting/decoding unit 19, and a supervisor 16 to manage these fundamental functions.

The read/write portion 17 is a functional portion to read, write or erase data from/to a data memory, etc. The code set up/code collation unit 18 stores a code number that is set by a user, protects it from being read after the code number is set, collates it with a code number that is input from an external device and approves the subsequent process. The encrypting/decoding unit 19 has a function to execute the encryption to prevent leakage and forgery of communication data and decoding of the encrypted data when data is exchanged between the reader/writer 8 and the IC card 7 via a communication line. The supervisor 16 has a function to read functional code input from the reader/writer 8 or a functional code added to data, and have the IC card 7 to execute the operation according to the contents of the code.

Figure 3:
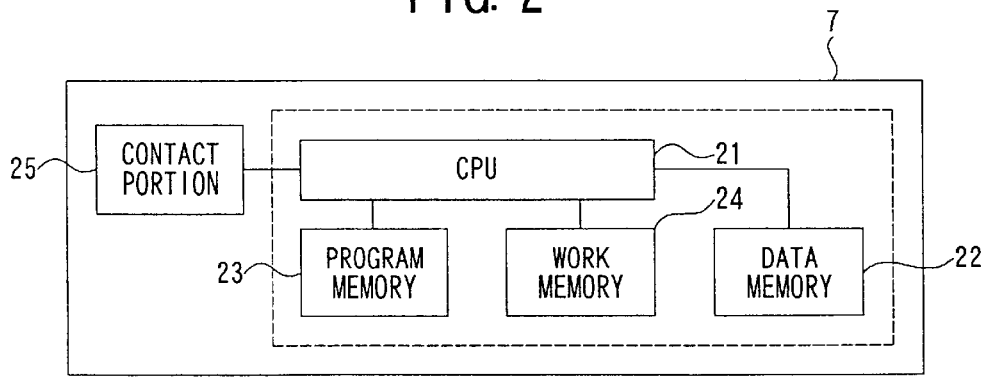
FIG. 3 is a block diagram showing the control of an IC card that is used for the loyalty point system.

FIG. 3 is a diagram showing a control block of the IC card 7. As shown in FIG. 3, the IC card 7 is composed of a CPU 21, a data memory 22, a program memory 23 and a work memory 24, which are storage memories, and a contact portion 25 to get the electrical contact with the reader/writer 8, to execute such functions as shown in FIG. 2. Out of these devices, the CPU 21, the data memory 22, the program memory 23 and the work memory 24 are formed into a single IC chip (or a plurality of IC chips) and embedded in the main body of IC card.

The program memory 23 is composed of, for example, a mask ROM and stores a control program of the CPU 21 equipped with a subroutine to realize such the fundamental functions as described above and further, has a function to download an application program.

The data memory 22 is used for storing applications including a loyalty point service application and data and is composed of, for example, a non-volatile memory that can be erased such as EEPROM. The work memory 24 is a memory that is used in working and is composed of, for example, such a volatile memory as RAM, etc.

FIG. 4 is a diagram showing a table T1 relative to individual information that is stored in the data memory 22 of the IC card 7. As shown in FIG. 4, such individual information as, for example, name "HANAKO TOSHIBA" 22a, data of birth "1970-3-3" 22b, management number "98765" 22c, phone number "03-1234-5678" 22d, number of times of coming to store "3 times" 22e, purchase amount of money "12345 Yen" 22f, number of loyalty points "500 points" 22g, adding date of loyalty point "2000-1-1" 22h, and term of validity "2000-3-31" 22I are stored in the data memory 22.

Of these individual information, information relative to name 22a, data of birth 22b and management number 22c is fixed information. Information relative to phase number 22d, number of times of coming to the store 22e, purchase amount of money 22f, number of loyalty point 22g, adding data of loyalty point 22h and term of validity 22I are variable information. In particular, of these variable information, number of times of coming to the store 22e, purchase amount of money 22f, number of loyalty points 22g and adding date of loyalty point 22h are information to be updated whenever a customer who has the IC card 7 purchases merchandise.

FIG. 5 is a diagram showing a table T2 of the loyalty point service information related to the loyalty point service application stored in the data memory 22 of the IC card 7. As shown in FIG. 5, "Item", "Qualification", "Ratio of Service" for the service to be added especially in connection with the individual information are to be stored/set on the table T2 of the loyalty point service.

As the "Item" to be added to the service especially in connection with the individual information, for example, "Number of Basic Loyalty points" 30, "Number of Visiting Store" 31, "Date of Birth" 32, "Purchase Amount of Money" 33 and "Phone Number" 34 are stored/set. Corresponding to "Number of Basic Loyalty Points" 30, "Every 100 Yen" 30a and "5 Loyalty point" 30b are stored as "Qualification" and "Service Ratio", respectively. So, it is so set that 5 loyalty points are added to the number of basic loyalty points for the purchase of every 100 yen.

Further, corresponding to "Number of Visiting Store", plural figures ire set for "Qualification" and "Service Ratio" so that a different "Service Ratio" is set for each qualification step. That is, as "Qualification", "Above 5", "Above 10" and "Above 20" 31a are set by stages. As "Service Ratio", "2 multiple", "3 multiple" and "5 multiple" 31b are set by stages. As a result, when the number of visiting store is above 5, the calculated number of loyalty points is doubled and when above 10, the number of loyalty points is trebled and when above 20, it is increased, by a multiple of 5.

Further, corresponding to the data of birth 32, "Agreed with Date" 32a is stored as "Qualification" and "3 multiple" is stored as "Service Ratio". As a result, it is so set that when "Date of Birth" agreed with the data information, the number of calculated loyalty points is further trebled.

Further, corresponding to "Purchase Amount of Money" 33, plural figures are set for "Qualification" and "Service Ratio" so that "Service Ratio" becomes different according to the qualification step. That is, "above 50,000 yen", "Above 80,000 yen" and "Above 100,000 yen" 33a are set by stages as "Qualification", "2 multiple", "3 multiple" and "5 multiple" 33b are stored by stages as "Service Ratio". As a result, it is so set that when the purchase amount of money is above 50,000 yen, the calculated number of loyalty points is further doubled, when above 80,000 yen, it is trebled and when above 100,000 yen, it is further increased by a multiple of 5".

Further, corresponding to "Phone Number", "Lower 2 digits agrees with 01" 34a is stored as "Qualification" and "3 multiple" 34*b* is stored as "Service Ratio". It is so set that as a result, when the lower 2 digits of a phone number agreed with "01", the calculated number of loyalty points is further trebled.

Figure 6:
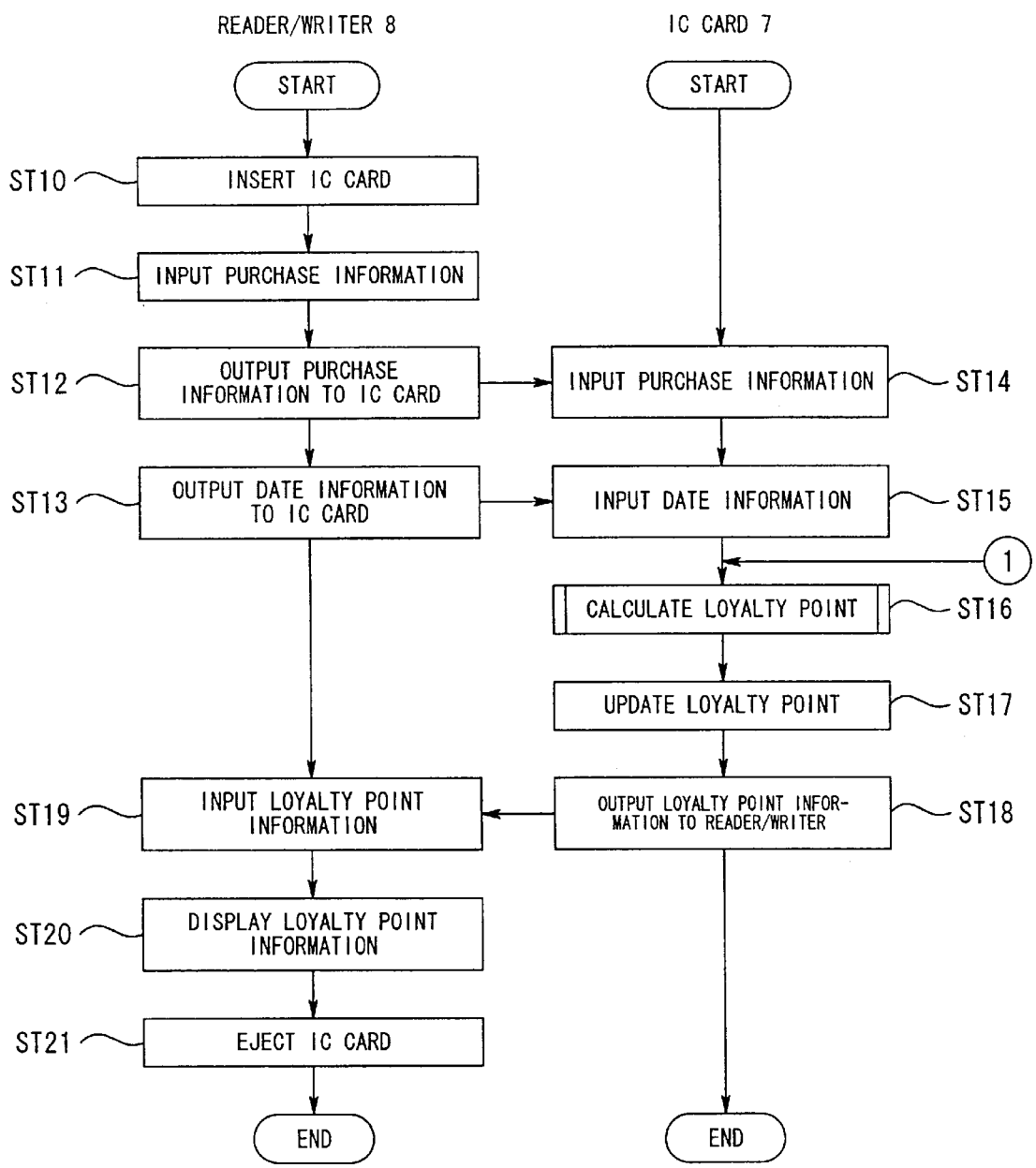
FIG. 6 shows flowcharts relative to a reader/writer and an IC card for explaining a loyalty point adding process that is executed when a customer who has an IC card purchases merchandise, etc. by a loyalty point system.

FIG. 6 is a flowchart that explains the loyalty point adding process executed by the reader/writer 8 and the IC card 7 when a customer who has the IC and 7 purchases merchandise according to the loyalty point system using the IC card 7 set as described above. As shown in FIG. 6, first when the IC card is inserted into the IC card slot 8*c* of the reader/writer 8 (ST10), various purchase information, for example, purchase amount of money and the like are input by a store clerk from the keyboard (ST11). When the purchase information is input in the step ST11, the reader/writer 8 outputs the purchase information and also, the date information to the IC card 7 (ST12) and is put in the standby state (ST13).

When the purchase information and date information are input from the reader/writer 8 to the IC card 7 via the contact portion 25 (ST14 and ST15), the CPU 21 executes the loyalty point calculation process described later" (ST16). When the loyalty points are calculated in Step ST16, the CPU 21 updates the individual information 22*e*–22*b* stored in the data memory 22. That is, the CPU 21 stores a new figure of "Number of visiting store" 22*e* with "+1" added in the table T1 of the data memory 22. Further, CPU 21 stores a new purchase amount of money added with the purchase amount of money of this time in the table T1. Further, the CPU 21 stores a new number of loyalty point added with a number of loyalty points calculated this time to "Number of loyalty points" 22*g* in the Table T1 and stores the data information of this time for "Adding date of loyalty point" 22*h* in the Table T1 (ST17). In addition, the CPU 21 outputs the loyalty, point information calculated in Step ST16 to the reader/writer 8 (ST18), II When loyalty point information that is output from the IC and 7 is input (ST19), the reader/writer 8 displays that information on the display 8*a* for a visual check by a customer who has an IC card (ST20), ejects the IC card for returning to that customer (ST21) and terminates the loyalty point adding process.

Figure 7:
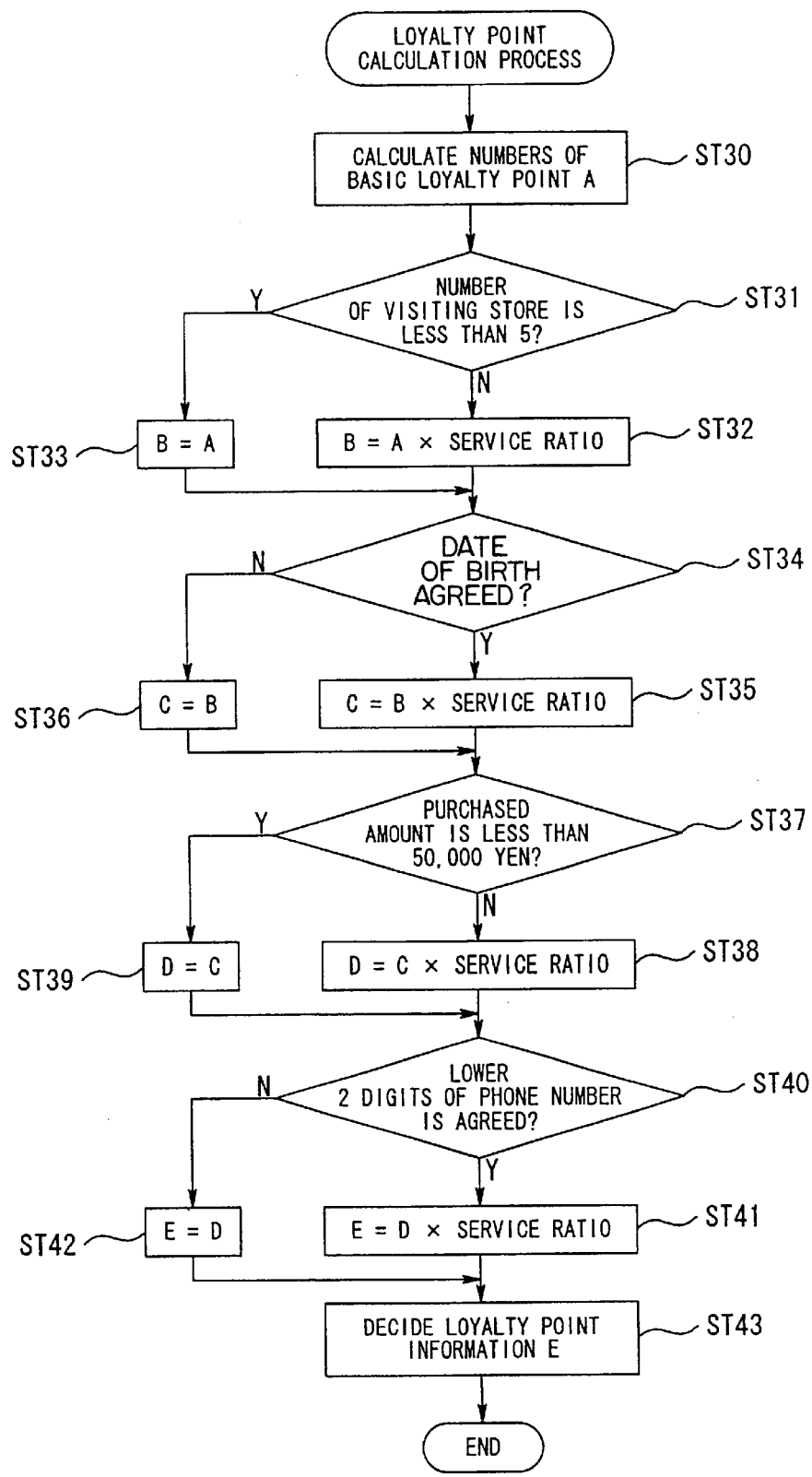
FIG. 7 is a flowchart for explaining a loyalty point calculating process of the IC card in Step ST16 shown in FIG. 1.

FIG. 7 is a flowchart for explaining the loyalty point calculation process of the IC card in Step ST16 shown in FIG. 6. As shown in FIG. 7, the CPU 21 of the IC card 7 first calculates a new purchase amount of money by adding the purchase amount of money information of this time included in the purchase information input in Step ST14 to "Purchase Amount of Money" 22*f* on the table T1 of the data memory 22. Then, based on "Qualification" of "Number of Basic Loyalty Points" 30; that is, "Every 100 Yen" and "Service Ratio"; that is, "5 point" on the Table T2 of the data memory 22, the CPU 21 calculates the number of basic loyalty point A corresponding to a new money information (ST30).

Next, the CPU 21 compares a new number of visiting store, which is "+1" added to the number of times read from "Number of Visiting Store" 22*e* on the table T1 of the data memory 22, with the number of times that is set for "Qualification" (Above 5 times, 10 times and 20 times) 31*a* of "Number of Visiting Store" (ST31) on the table T2 of the data memory 22. As a result of the comparison in Step ST31, when the new number of visiting store is in excess of 5, 10 or 20, special loyalty points corresponding to the number of visiting store are added. That is, numbers of loyalty point B that is the number of basic loyalty points calculated in Step ST30 multiplied by "Service Ratio" (2, 3 or 5 multiple) 31*b* corresponding to the Table T2 is calculated (ST32). As a result of the comparison in Step ST31, when a new number of times of visiting store is less than 5, a special loyalty point according to the number of visiting store is not added (that is, B=A) (ST33).

Next, the CPU 21 compares the data read from "Date of Birth" 22*b* of the Table T1 with the date information input in step ST15 (ST34). As a result of the comparison in Step ST34, when the date of birth agreed with the date of this time, the special loyalty point in connection with the data of birth is added. That is, the number of loyalty points C is calculated by multiplying the number of loyalty points B calculated in Step ST32 or ST33 by "Service Ratio" (3 multiple) corresponding to "Date of Birth" 32 on the table T2 (ST35). As a result of the comparison in Step ST34, when the date of birth does not agree with the date of this time, a special loyalty point in connection with the date of birth is not added (that is, C=B) (ST36).

Then, the CPU 21 compares the selling amount of this time that is included in purchase information input in Step ST14 with the amount of money set for the qualification (above 50,000 yen, 80,000 yen and 10,000 yen) 33*a* of "Purchase Amount of Money" 33 on the table T2 (ST37). As a result of the comparison in Step ST37, when the purchase amount of money of this time is in excess of 50,000 yen or 80,000 yen or 100,000 yen, a special loyalty point in connection with the purchase amount of money is added. That is, the number of loyalty points D is calculated (ST38) by multiplying the number of loyalty points C that is calculated in Step ST35 or ST36 by "Service Ratio" (2, 3 or 5 multiple) 33*b* corresponding to "Purchase Amount of Money" 33 on the table T2. As a result of the comparison in Step ST37, when the purchase amount of money of this time is below 50,000 yen, a special loyalty point in connection with the purchase amount of money is not added (that is, D=C) (ST39).

Then, the CPU 21 compares the lower two digit values of a phase number read from "Phone Number " 22*d* on the table T1 with a value "01" set for "Qualification" (the lower two digits are 01) of "Phone Number" 34 on the table T2 (ST40). As a result of the comparison in Step ST40, when the lower two digits are "01", a special loyalty point in connection with the phase number is added. That is, the number of loyalty points E is calculated (ST41) by multiplying the number of loyalty points D calculated in Step ST38 or ST39 by "Service Ratio" (3 multiple) 34*b* corresponding to "Phone Number" on the table T2. As a result of the comparison in Step ST40, when the lower 2 digits are not "01", a special loyalty point in connection with the phase number is not added (that is, E=D) (ST42). Thus, the number of loyalty points E calculated in Step ST41 or ST42 is decided as the number of loyalty points at this time and the loyalty point calculation process is terminated (ST43).

Figure 8:
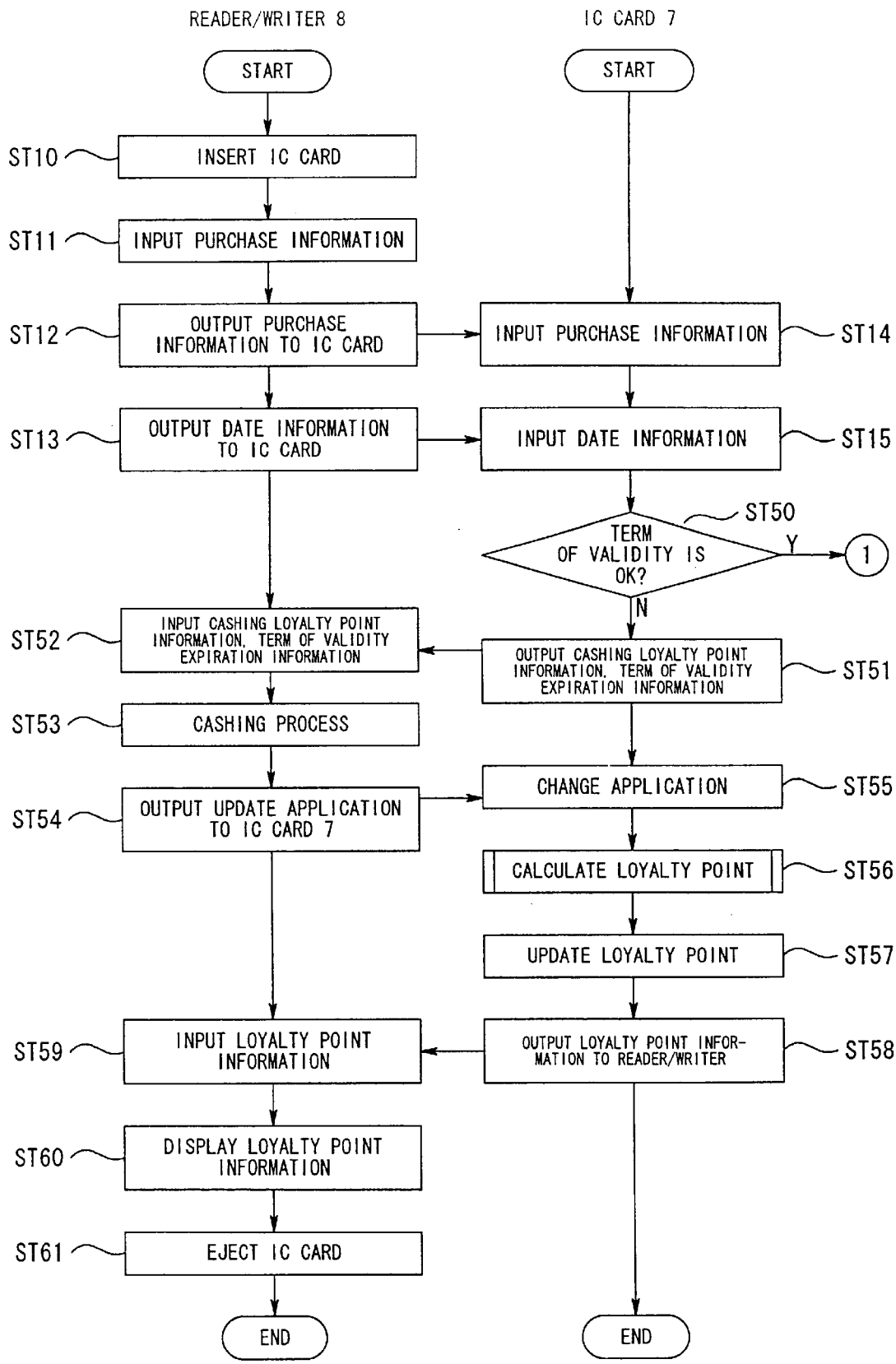
FIG. 8 illustrates flowcharts for explaining the installation of a loyalty point service application to an IC card of which term of validity is over in the loyalty point system using an IC card.

FIG. 8 is a flowchart for explaining the installation of a loyalty point service application in the IC card 7 that expired the data of validity in the loyalty point system A using the IC card 7 set as described above. That is, in this embodiment, when the term of validity of the IC card 7 expired, after the cashing process of loyalty points, the application in the IC card is changed to another higher loyalty point service application. Further, those portions for the same process as shown in FIG. 6 are assigned with the same step numbers.

As shown in FIG. 8, when the IC card is first inserted into the IC card slot 8*c* of the reader/writer 8 (ST10), various kinds of purchase information including purchase amount of money information are input by a store clerk through the keyboard 8*b* (ST11). When the purchase information is input in ST11, the reader/writer 8 outputs the purchase information to the IC card 7 (ST12) and also, outputs the date information and is placed in the standby state (ST13).

When purchase information and date information are input to the IC card 7 from the reader/writer via the contact portion 25 (ST14 and ST15), the CPU 21 reads "Term of Validity" 22i output of the table T1 of the data memory 22 and compares it with date information input in Step ST15 (ST50). As a result of the comparison in Step ST5, when the date is judged to be within the term of validity, the work proceeds to the loyalty point calculation process in Step 16. Further, when the date is judged to be within the term of validity, the process contents after Step ST16 are the same as the processes after Step ST16 shown in FIG. 6. Further, when it is judged the term of validity expired as a result of the comparison in Step ST50, the CPU 21 reads "Number of Loyalty Points" 22g out of the table T1 and outputs information on the expiration of the term of validity to the reader/writer 9 together with this "Number of Loyalty Points" as cashing information of loyalty point (ST51).

When information on cashing loyalty point and information on the term of validity expiration output from the IC card 7 are input to the reader/writer 8, the reader/writer 8 executes a prescribed cashing process for information on the cashing loyalty point and returns the service for the cashing loyalty point to a customer holding the IC card 7 (ST53). Further, the reader/writer 8 outputs a loyalty point service application for changing with the improved services including loyalty point ratio, etc. based on the input information on the expiration of term of validity (ST54).

When the loyalty point service application for changing is input to the IC card 7 from the reader/writer 8, the CPU 21 updates the loyalty point service application in the data memory 22 (ST55). When the updating of the application in Step ST59 is completed, the CPU 21 proceeds to Step ST56 and executes the loyalty point calculation process for the purchase of this time (ST56). When the loyalty point is calculated in Step ST56, the CPU 21 updates the individual information 22e–22h stored in the data memory 22. That is, the CPU 21 stores a new number of times with "+1" added to "Number of Visiting Store" 22e in the table T1 of the data memory 22, stores a new purchase amount of money with the purchase amount of money of this time added to "Purchase Amount of Money" 22f in the Table T1, stores a new number of loyalty points with the number of loyalty points calculated this time added to "Number of Loyalty Points" 22g in the table T1, and stores the date information of this time for "Adding Date of Loyalty Point" 22h of the table T1 (ST57). In addition, the CPU 21 outputs information on the loyalty point calculated in Step ST56 to the reader/ writer 8 (ST58).

When information of loyalty point that is output from the IC card 7 is input to the reader/writer 8 (ST59), the loyalty point is displayed on the display 8a for the visual check by a customer who has the IC card (ST60), the IC card is ejected for returning to the customer (ST61), the application change process and the loyalty point adding process are terminated.

Figure 9:
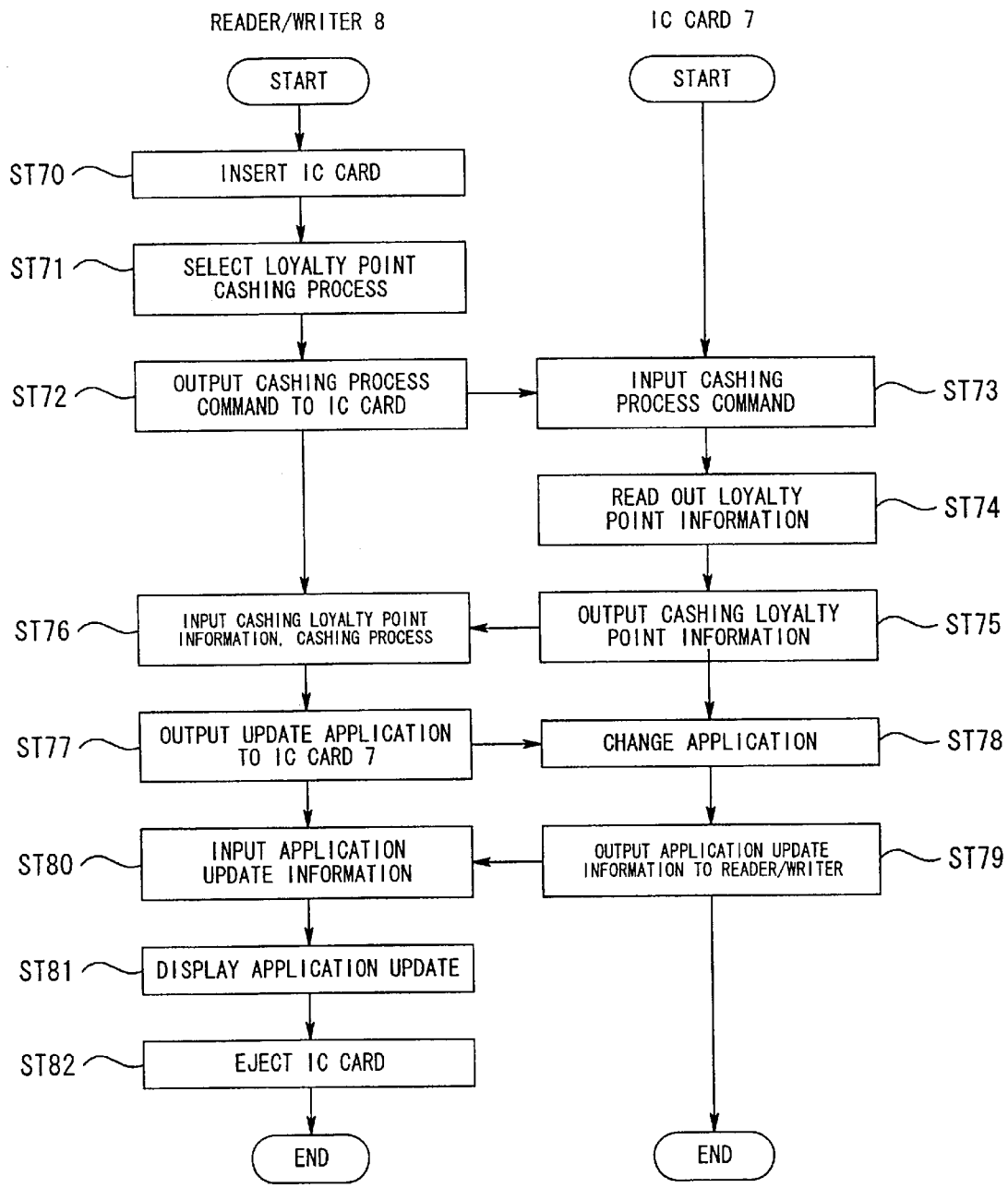
FIG. 9 is a flowchart for explaining the installation of a loyalty point service application to an IC card and an associated cashing process in the loyalty point system using an IC card.

FIG. 9 is a flowchart for explaining the installation of a loyalty point service application to the IC card 7 in connection with the cashing process of loyalty points in the loyalty point system A using the IC card 7 set as described above. In this embodiment, when the cashing process of loyalty points recorded in the IC card 7 is executed, the loyalty point service application in the IC card 7 is changed to another higher loyalty point service application for further increase the service.

As shown in FIG. 9, when the IC card is first inserted into the IC card slot 8c of the reader/writer 8 (ST70), a store clerk selects "Loyalty Point Cashing Process" through the keyboard 8b (ST71). When the loyalty point cashing process is selected in Step ST71, the reader/writer 8 first outputs a cashing process command to the IC card 7 and enters the standby state (ST72).

When the cashing process command is input to the IC card 7 from the reader/ writer 8 via the contact portion 25 (ST73), the CPU 21 reads loyalty point information out of "Number of Loyalty Points" 22g on the table T1 of the data memory 22 (ST74) and outputs it to the reader/writer 8 as loyalty point cashing information (ST75).

When loyalty point cashing information output from the IC card is input, the reader/writer 8 executes a prescribed cashing process for cashing loyalty point information according to the preset loyalty point service application, and returns a service according to the cashing loyalty point to a customer who has the IC card (ST76). Further, the reader/ writer 8 outputs the loyalty point service changing application to the IC card (ST77).

When the loyalty point service changing application is input to the IC card 7 from the Reader/writer 8, the CPU 21 updates the loyalty point service application in the data memory 22 (ST78). When the application updating in Step ST78 is completed, the CPU 21 outputs the information that the application was updated to the reader/writer 8 (ST79).

When information associated with the updating of the application is input from the IC card 7 (ST80), the reader/ writer 8 displays the completion of the application updating on the display 8a for a store clerk (ST81), ejects the IC card for returning to a customer who has hte IC card (ST82), and terminates the application change process.

As described above, this invention is able to calculate loyalty point in an IC card based on a loyalty point service application which is pre-stored in the IC card memory by inputting purchase information comprising at least purchase amount of money into the IC card. As a result, it has an effect to prevent the forgery of illegal loyalty points.

Further, because loyalty service loyalty points are calculated/updated on an IC card, it becomes possible to calculate loyalty points without installing a loyalty point service application to the reader/writer and executing the data processing by the reader/writer. Accordingly, a burden of the data process on the reader/writer can be largely reduced, and it becomes possible to use a cheap reader/ writer and contribute to the spread use of the loyalty service point system.

Further, as described above, this invention calculates loyalty service points in connection with individual information without obtaining it from an IC card, that is, adds loyalty service points especially in connection with individual information. Therefore, it has an effect that loyalty service points can be added in connection with individual information while retaining its security without leaking individual information to the outside.

Further, as described above, this invention is capable of updating the loyalty point service application that is stored in an IC card. Accordingly, it becomes possible to easily change size of loyalty points calculated in an IC card and service objects to which loyalty points are added. Particularly in this embodiment, when the loyalty point cashing process is executed, the loyalty point service application can be changed to another loyalty point service application which is for providing a further improved service including loyalty point ratio or after executing the loyalty point cashing process for an IC card of which term of validity is expired, it can be changed to the loyalty point service application. Accordingly, the service to an IC card holding customer is increased and the spread use/firmly fixing of the loyalty point system.

As explained above, according to the present invention, it is possible is calculate loyalty point information and service loyalty points can be calculates corresponding to individual information while holding security.

What is claimed is:

1. A portable electronic device to execute a prescribed process according to information on a deal amount of money input from a terminal device comprising:

storage means for storing an application program for calculating loyalty points, and individual information of a person holding the portable electronic device, a qualification unit to add a special loyalty point based on the individual information, a size of a loyalty point added that corresponds to the qualification unit and a total loyalty point calculated by the application program;

means for calculating a first loyalty point using the application program stored in the storage means according to the information on the deal amount of money input from the terminal device, a second loyalty point using the application program stored in the storage means according to the corresponding qualification unit when the qualification unit is satisfied, and a total loyalty point by adding the second loyalty point with the first loyalty point; and means for updating the loyalty point stored in the storage means to the total loyalty point calculated by the calculating means.

2. A portable electronic device to execute a prescribed process according to information on a deal amount of money input from a terminal device, comprising:

storage means for storing an application program for calculating loyalty points, a qualification unit to add a special loyalty point in connection with date information, a size of a loyalty point added corresponding to the qualification unit and a total loyalty point calculated by the application program;

means for calculating a first loyalty point using the application program stored in the storage means according to the information on the deal amount of money input from the terminal device, a second loyalty point using the application program stored in the storage means according to the corresponding qualification unit when the date information input from the terminal device satisfies the qualification unit stored in the storage means and a total loyalty point by adding the second loyalty point with the first loyalty point; and means for updating the loyalty point stored in the storage means to the total loyalty point calculated by the calculating means.

3. A portable electronic device to execute a prescribed process according to information on a dead amount of money input from a terminal device, comprising:

storage means for storing an application program for calculating loyalty points, individual information of customers who have a portable electronic device, a qualification unit for adding a special loyalty point associated with the individual information and date information, a size of loyalty point to be added especially corresponding to the qualification unit and a total loyalty point calculated by the application program;

means for calculating a first loyalty point using the application program stored in the storage means according to the information on the deal amount of money input from the terminal device, means for calculating a second loyalty point using the application program stored in the storage means according to the corresponding qualification unit when the qualification unit stored in the storage means in satisfied based on the date information input from the terminal device and the individual information stored in the storage means and a total loyalty point by adding the second loyalty point with the first loyalty point; and means for updating the loyalty point stored in the storage means to the total loyalty point calculated by the calculating means.

4. A portable electronic device according to claim 1, further comprising:

output means for outputting a loyalty point calculated by the calculating means to the terminal device.

5. A portable electronic device according to claim 1, further comprising:

output means for outputting the loyalty point calculated by the calculating means to the terminal device after updating the loyalty point stored in the storage means by the updating means.

6. A portable electronic device according to claim 1, further comprising:

means for executing an exchanging process of the loyalty point stored in the storage means based on the information stored in the storage means when an instruction for the exchanging process to exchange a loyalty point to another value is received from the terminal device; and means for outputting the result of exchange by the execution means to the terminal device.

7. A portable electronic device according to claim 1, further comprising:

means for executing the loyalty point exchange process for the loyalty point stored in the storage means according the an application program stored in the storage means when an instruction is input from the terminal device for the exchange process to exchange the loyalty point to another valuable thing; and means for executing the rewrite of an application program stored in the storage means according to an instruction from the terminal device when the exchange process by the execution means is completed.

8. A portable electronic device according to claim 1, wherein the storage means stores the information of a term of validity relative to the portable electronic device.

9. A portable electronic device according to claim 8, further comprising:

judging means for judging whether the term of validity of the portable electronic device has expired by comparing the date information input from the terminal device with the term of validity information stored in the storage means;

means for executing the loyalty point calculation process by the calculation means when the judging means judges that the term of validity is not yet expired and to execute the exchange process to exchange the loyalty point stored in the storage means to another valuable thing based on the information stored in the storage means when the judging means judges that the term of validity is expired; and means for outputting the loyalty point calculated by the calculation means to the terminal device when the term of validity is judged to have not yet been expired by the judging means and to output the information showing that the term of validity has been expired together with the result of exchange by the execution means to the terminal device.

10. A portable electronic device according to claim 1, wherein the storage means stores the information on the term of validity of the portable electronic device.

11. A portable electronic device according to claim 10, further comprising:

judging means for judging whether the term of validity of the portable electronic device was expired by comparing the date information input from the terminal device with the term of validity information stored in the storage means;

means for executing the loyalty point calculation process by the calculation means when the judging mean judges that the term of validity has not yet been expired and execute the exchange process to exchange the loyalty point stored in the storage means to another valuable thing according to the application program stored in the storage means when the judging means judges that the term of validity was already expired;

means for outputting the loyalty point calculated by the calculation means to the terminal device when the judging means judges that the term of validity has not yet been expired and to output the information showing that the term of validity was already expired to the terminal device together with the result of exchange by the execution means;

means for executing the rewrite of the application program stored in the storage means according to the instruction from the terminal device after outputting the information showing the expiration of the term of validity by the output means when the judging means judges that the term of validity was already expired; and control means for controlling the calculation means to execute the loyalty point calculation process according to the rewritten application program stored in the storage means after completing the rewriting process by the rewriting means.

12. A loyalty point system comprising a terminal device having an input means for inputting prescribed information and a portable electronic device to execute prescribed processes for the information input from the terminal device; wherein, the portable electronic device includes;

storage means for storing a prescribed application program for calculating loyalty points corresponding to a deal amount of money and loyalty points;

means for calculating a loyalty point based on the information on the deal amount of money input from the terminal device according to the application program stored in the storage means;

means for updating the loyalty point stored in the storage means to the loyalty point calculated by the calculation means; and output means for outputting the loyalty point calculated by the calculating means to the terminal device;

the terminal device includes;

display means for displaying a loyalty point output from the portable electronic device;

application storage means for storing another application program separately from the application program stored in the portable electronic device; and output means for outputting a rewriting instruction of the application program and another application program stored in the application storage means to the portable electronic device according to the instruction from the input means.

13. A loyalty point system according to claim 12, wherein the portable electronic device further includes:

means for executing the rewriting instruction to rewrite the application stored in the stored means to the application program output from the terminal device according to the rewriting instruction of the application program output from the terminal device.

14. A loyalty point system according to claim 12, wherein the terminal device further includes;

means or instructing an exchange process to exchange the loyalty point stored in the portable electronic device to another value;

the portable electronic device further includes;

means for executing the exchange process of the loyalty point stored in the storage means based on the application program stored in the storage means when the exchange process to exchange the loyalty point to another value is instructed from the terminal device; and output means for outputting the result of exchange by the execution means to the terminal device.

* * * * *